Aug. 3, 1937.   A. L. KRONQUEST   2,089,125
METHOD OF MAKING SHEET METAL CAN BODIES
Original Filed May 3, 1935
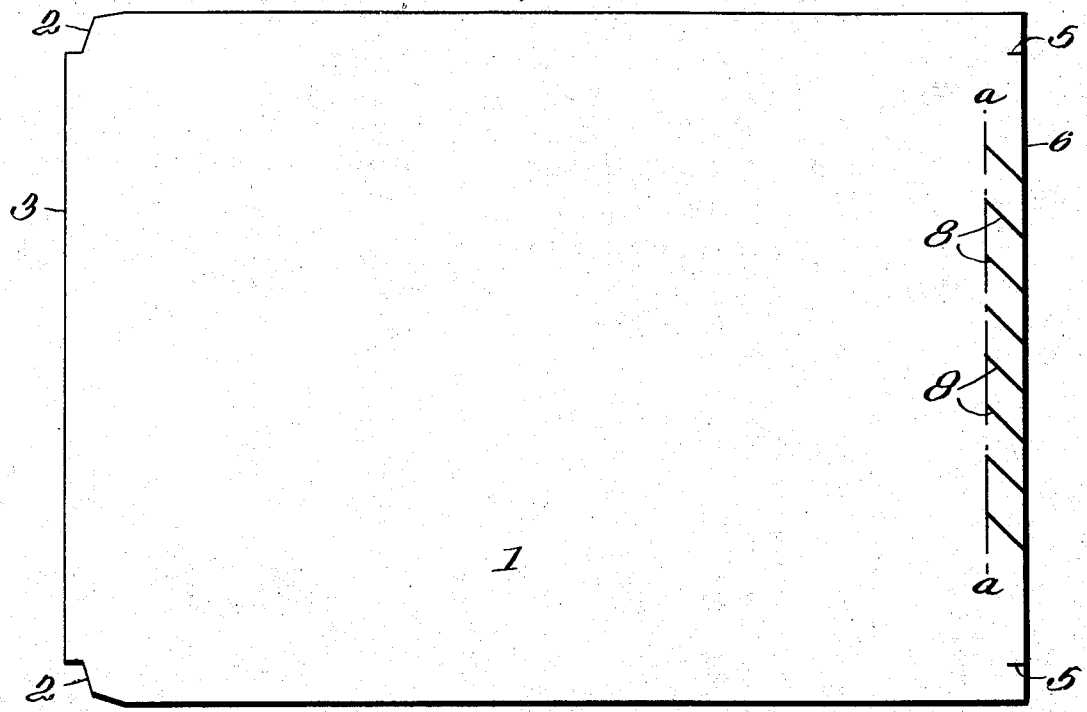
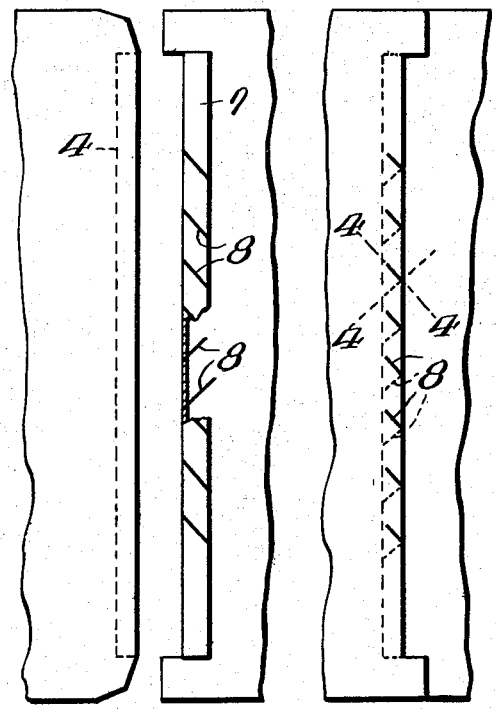
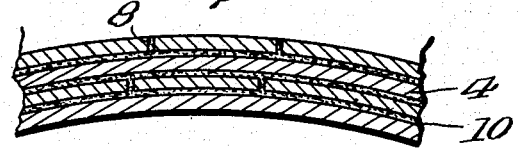
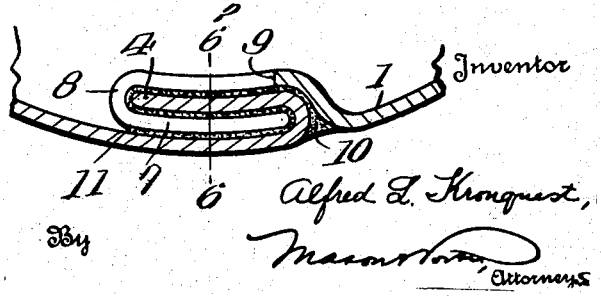

Patented Aug. 3, 1937

2,089,125

UNITED STATES PATENT OFFICE 2,089,125

METHOD OF MAKING SHEET METAL CAN BODIES

Alfred L. Kronquest, Syracuse, N. Y., assignor to Continental Can Company, Inc., New York, N. Y., a corporation of New York Original application May 3, 1935, Serial No. 19,717, now Patent No. 2,083,452, dated June 8, 1937. Divided and this application October 28, 1935, Serial No. 47,183

1 Claim. (Cl. 113—120)

The invention relates to new and useful improvements in the method of making a sheet metal can body. It is a common practice in making a sheet metal can body to shape the metal blank from which the can body is to be formed so as to provide a side seam having lapping sections at the ends thereof and interlocking hooks extending from one lapping section to the other. The interlocked hooks are bumped and then molten solder is applied to the side seam for solder bonding the same. Considerable difficulty has been experienced in the solder bonding of the interfolded parts of the side seam due to the trapping of the heated gases which prevents the solder from flowing by capillary attraction to the extreme limits of the side seam.

An object of the present invention is to provide a method of forming the side seam of a can body which will permit the solder to flow by capillary attraction throughout the entire limits of the side seam.

In the drawing—

Figure 1 is a plan view of a sheet metal blank shaped for forming a can body, which blank is constructed so as to aid in the solder bonding of the interengaging hooks forming the side seam;

Fig. 2 is a view showing the hooks formed on the blank prior to the interengaging of the same;

Fig. 3 is a view showing the hooks united and bumped ready for solder bonding;

Fig. 4 is a sectional view on an enlarged scale on the line 4—4 of Fig. 3;

Fig. 5 is a similar view after the solder bond has been applied thereto, and

Fig. 6 is a longitudinal sectional view through the side seam on an exaggerated enlarged scale showing the curving of the side seam during solder bonding.

In carrying out the invention, a sheet of metal is cut so as to provide a body blank which is indicated at 1 in the drawing. This body blank is notched at 2, 2, so as to form an offset portion 3 which is bent back to form a hook indicated in dotted lines at 4 in Fig. 2 of the drawing. The other edge portion of the body blank 1 is provided with slits 5, 5 offsetting a portion 6 which is bent back to form a hook indicated at 7 in Fig. 2 of the drawing.

The body blank is also provided with slits 8, 8. There are a series of these slits, and they are comparatively closely spaced and disposed throughout a considerable portion of the length of the offset portion 6 forming the hook 7. These slits extend, as shown in the drawing, at an angle to the edge of the metal and preferably at an angle of about forty-five degrees. The slits terminate on the line $a, a$ which is the extreme limits of the side seam. In other words, the line $a, a$ is substantially beneath the edge of the inturned hook 7 as shown in Fig. 2 of the drawing.

After the blank is shaped, it may be curved at once into the cylindrical body form and the edge portions turned back to form the hooks, but preferably the edge portions are turned back to form the hooks 4 and 7 first, after which the blank is formed into cylindrical shape. The hooks 4 and 7 are interlocked in the usual way and then bumped. This completes the can body ready for solder bonding.

In Fig. 4 of the drawing, there is shown on an enlarged scale a section along one of the slits in the side seam. It will be noted that the slit 8 extends to the point 9 which is substantially the limit of the side seam. In the applying of a solder bond to the side seam, the metal throughout the region of the side seam is heated and the heating of the metal incident to the solder bonding will cause the side seam of the can body to curve inwardly as indicated in Fig. 6. The reason for this is that the heat is applied to the can body in the region of the side seam only. The slitting of the edge portion of the metal throughout the entire region of the hook 7 provides spaces between the cut edges through which heated gases may escape. The curving of the side seam tends to separate the edges along the slit. For solder bonding the side seam, solder is applied to the outer surface of the side seam as indicated at 10 in Fig. 5 of the drawing. The molten solder will flow by capillary attraction between the contacting metal parts. Any gases formed in advance of the flowing solder will pass out between the side walls of the slits and this will allow a free flowing of the solder by capillary attraction along the contacting surfaces between the hook 4 and the inner portion of the can body underlying the hook 7. The solder will also flow around the end of the hook 4 and along the inner face of the hook 7 and the under face of the hook 4. Here again, any gases accumulated ahead of this flowing solder will escape through the spaces between the edges of the slit 8. The solder will continue to flow along the outer face of the hook 7 and the inner face of the body to the extreme outer limits of the side seam as indicated at 11. It is extremely important that the solder bond shall extend to this outer limit 11, for the reason that when the seam is put under strain, due to internal pressure developing in the container which tends to expand the can body, if the side seam gives way, it is because the solder bond between the outer face of the hook 7 and the can body wall is ruptured. When the interlocked hooks are solder bonded without forming slits such as described, the gases are likely to be trapped in the interfolded parts of the metal and the solder will not flow all the way to the extreme limit indicated at 11. This makes a weak solder bonding which is liable to be ruptured under strain due to internal pressure within the container. With the slits formed, however, as described above, I am able to produce a solder bond for a lock seam can body which is substantially uniform all the way to the extreme limits of the contacting metal portions forming the side seam.

As noted above, the slits are preferably formed at an acute angle to the edge of the side seam. The slit extends from the free edge of the hook to the limits of the side seam, and therefore, it extends around into the body of the can and across the portion thereof which is directly beneath the hook. When the hook is turned back the slit in the hook portion will extend at an angle to that portion of the slit running around into the body portion. In other words, the slit in the hook is out of alinement with the slit in the body portion. The slit, in a measure, extends along the side seam and permits the gases to escape therethrough at different points lengthwise of the side seam. Furthermore, when the side seam is solder bonded, the solder unites the edges of the slits and this solder bond joining the edges extends along the side seam so that one part is not directly over another. The lateral strain on the side seam when the container is subjected to internal pressure will be distributed along this solder bond, joining the edges, and therefore, the slitting of the edge does not, in any way, weaken the side seam.

It is stated that the slits are closely spaced. They are spaced sufficiently close together so as to prevent the trapping of the gases between the same and to insure a continuous solder bond between the outer face of the hook 7 and the body wall beneath the same throughout the entire length of the side seam. The solder bonding is usually applied by a roll running in a bath of molten solder. The solder will flow freely between the contacting walls at the ends of the hooks where the gases are free to escape, and it is in the central region of the side seam where the gases are likely to be trapped so as to prevent proper solder bonding. Therefore, the slits are disposed in the central portion of the side seam, and it is not necessary to provide slits in the edge portions of the blank in the region immediately adjacent the ends of the hooks.

From the above it will be apparent that a new method of forming a lock and lap seam can body has been provided wherein a more efficient solder bonding can be accomplished throughout the entire extent of the side seam. The first step in the method consists in the shaping of the blank and the slitting of the edge portion which is to form the inner hook. The hooks are then formed in the usual manner and interlocked and bumped and the solder applied thereto. During the preheating of the side seam and the application of the molten solder thereto, the slits formed in the inner parts of the side seam will provide spaces allowing the forming gases, due to the heating of the flux, to escape and permit the solder to flow freely by capillary attraction to the extreme limits of the contacting metal parts forming the side seam.

The can body produced by the above-described method forms no part of the present invention, but is shown, described and claimed in a copending application filed May 3, 1935, Serial Number 19,717, now Patent #2,083,452 of which this application is a division.

It is obvious that changes in the details of construction and the method of carrying out the invention may be made without departing from the spirit of the invention as set forth in the appended claim.

Having thus described the invention, what I claim as new and desire to secure by Letters-Patent, is—

The method of making a sheet metal can body consisting in shaping a blank from which the can body is to be formed so as to provide a side seam having interlocking hooks, cutting the edge portion of the blank that is to form the inner hook of the side seam along parallel lines spaced from each other so as to form slits extending from the edge of the blank at an acute angle thereto to substantially the full limits of the side seam, bending the edge portions of the blank to form the hooks, and interlocking said hooks and bumping the same, preheating the side seam and applying molten solder to the outer face of the side seam, said slits operating to permit the gases forming during soldering to escape and a free flow of the solder throughout the entire limits of the side seam for the solder bonding of the seam.

ALFRED L. KRONQUEST.